(12) United States Patent
Wang et al.

(10) Patent No.: US 7,679,697 B2
(45) Date of Patent: Mar. 16, 2010

(54) BACKLIGHT MODULE WITH REFLECTOR HAVING REFLECTION PATTERN THEREAT AND LIQUID CRYSTAL DISPLAY HAVING SAME

(75) Inventors: Wei Wang, Miao-Li (TW); An Shih, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 511 days.

(21) Appl. No.: 11/586,853

(22) Filed: Oct. 26, 2006

(65) Prior Publication Data
US 2007/0091227 A1    Apr. 26, 2007

(30) Foreign Application Priority Data
Oct. 26, 2005    (CN)    .................... 2005 1 0100775

(51) Int. Cl.
*G02F 1/1335*    (2006.01)
(52) U.S. Cl. .......................................... 349/67; 349/65
(58) Field of Classification Search .................. 349/65, 349/67
See application file for complete search history.

(56) References Cited

U.S. PATENT DOCUMENTS

| 6,288,700 | B1 | 9/2001 | Mori | |
|---|---|---|---|---|
| 6,947,107 | B2* | 9/2005 | Yoshii et al. | 349/113 |
| 7,372,531 | B2* | 5/2008 | Jang et al. | 349/113 |
| 2003/0142247 | A1* | 7/2003 | Nishiyama et al. | 349/67 |
| 2008/0043174 | A1* | 2/2008 | Chen et al. | 349/67 |

FOREIGN PATENT DOCUMENTS

TW    200415418 A    8/2004

* cited by examiner

*Primary Examiner*—Sung H Pak
(74) *Attorney, Agent, or Firm*—Wei Te Chung

(57) ABSTRACT

An exemplary backlight module (11) includes a light guide plate (12), a reflector (18), and a light emitting diode unit (142). The light guide plate has a light incident surface (122). The reflector is positioned adjacent to the light incident surface, and has a reflection pattern (184) thereat. The light emitting diode unit is interposed between the light incident surface and the reflector.

20 Claims, 5 Drawing Sheets

BACKLIGHT MODULE WITH REFLECTOR HAVING REFLECTION PATTERN THEREAT AND LIQUID CRYSTAL DISPLAY HAVING SAME

FIELD OF THE INVENTION

The present invention relates to backlight modules such as those used in liquid crystal displays (LCDs), and more particularly to a backlight module having a reflector which has a reflection pattern thereat.

GENERAL BACKGROUND

Liquid crystal displays are commonly used as display devices for compact electronic apparatuses, because they not only provide good quality images but are also very thin. Because liquid crystal molecules in a liquid crystal display do not emit any light themselves, the liquid crystal molecules have to be lit by a light source so as to clearly and sharply display text and images. Therefore, liquid crystal displays usually require a backlight module.

Referring to FIG. 12, a typical backlight module 88 includes a light guide plate 880, a light source 882, and a reflector 884, arranged in that order from right to left. The backlight module 88 further includes a plastic frame 886 for receiving the light guide plate 880, the light source 882, and the reflector 884. The reflector 884 has a planar inner surface 885 facing the light source 882. The light source 882 interposed between the light guide plate 880 and the reflector 884 includes a plurality of light emitting diode (LED) units 888. Each LED unit 888 includes a red LED 888a, a green LED 888b, and a blue LED 888c, and each LED 888a/888b/888c can emit light beams of the one respective particular kind of primary color.

In operation, a mixing process of light beams occurs since each LED 888a/888b/888c emits one respective kind of light beams. The mixing process generally occurs in a space ranging from where the light beams emit from the LEDs 888a, 888b, and 888c to where the light beams reach the light guide plate 880, thus obtaining white light beams. However, the mixing space for the light beams is limited to a certain size of the plastic frame 886, and the mixed light beams are therefore liable to appear a little yellow or blue, instead of being pure white. This may result in an uneven color balance of light output by the backlight module 88. In order to obtain pure white light beams, the size of the plastic frame 886 is required to be large, which correspondingly increases a size of the backlight module 88. This makes the backlight module 88 unsuitable for certain compact and small-scale applications.

What is needed, therefore, is a backlight module that can overcome the above-described deficiencies. What is also needed is a liquid crystal display employing such a backlight module.

SUMMARY

In one preferred embodiment, a backlight module includes a light guide plate, a reflector, and a light emitting diode unit. The light guide plate has a light incident surface. The reflector is positioned adjacent to the light incident surface, and has a reflection pattern thereat. The light emitting diode unit is interposed between the light incident surface and the reflector.

Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
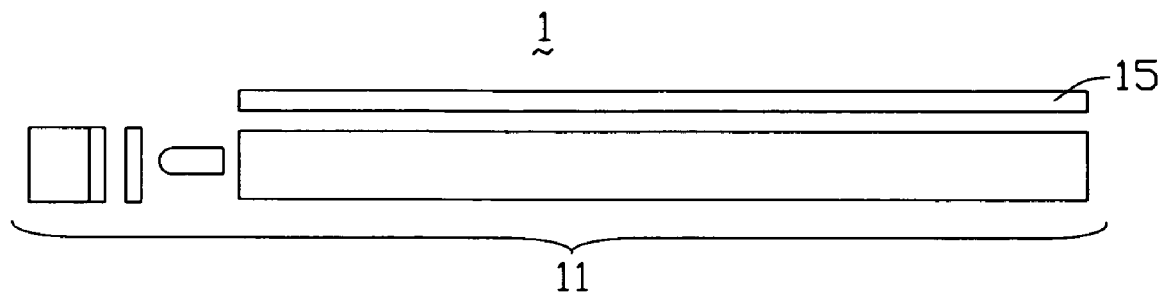
FIG. 1 is an exploded, side view of a liquid crystal display according to a first embodiment of the present invention, the liquid crystal display including a liquid crystal panel and a backlight module.
Figure 2:
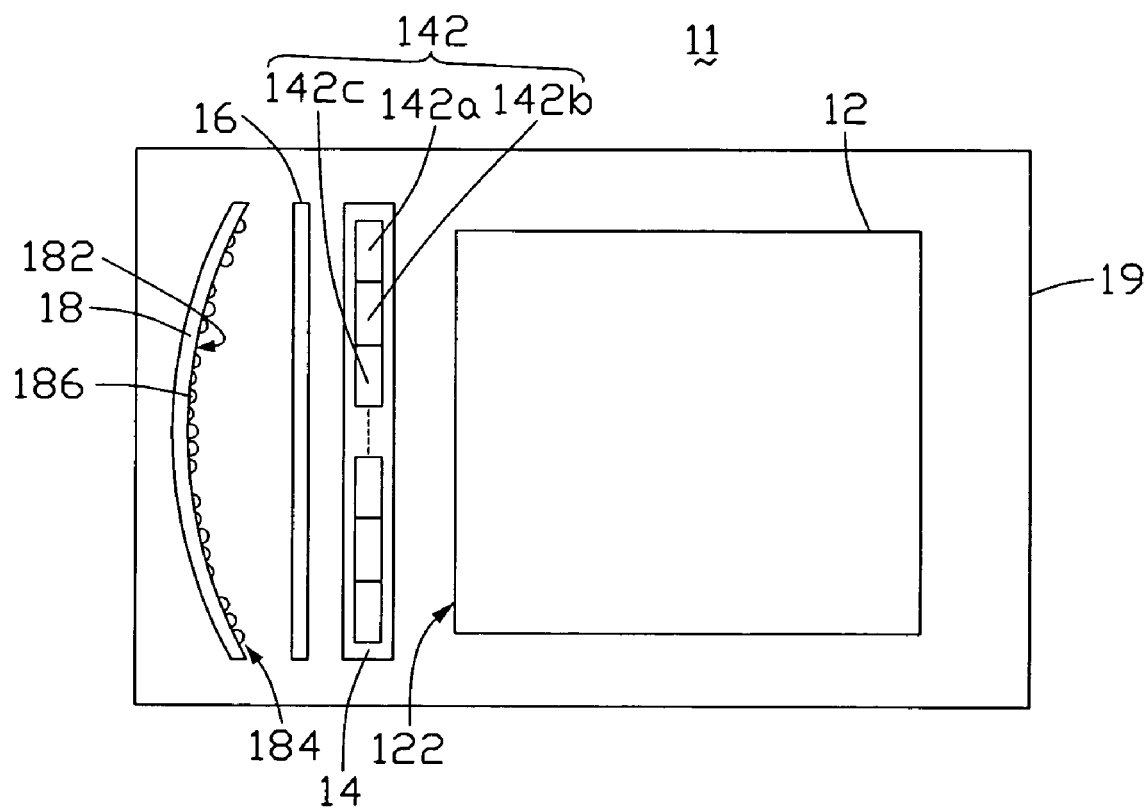
FIG. 2 is a top plan view of the backlight module of the liquid crystal display of FIG. 1, the backlight module including a reflector.

Referring to FIG. 1, a liquid crystal display 1 according to a first embodiment of the present invention is shown. The liquid crystal display 1 includes a liquid crystal panel 15, and a backlight module 11 adjacent to the liquid crystal panel 15. Referring also to FIG. 2, the backlight module 11 includes a light guide plate 12, a light source 14, a diffusing film 16, and a reflector 18, arranged in that order from right to left. The backlight module 11 further includes a frame 19 for receiving the light guide plate 12, the light source 14, the diffusing film 16, and the reflector 18.

The light source 14 interposed between the light guide plate 12 and the diffusing film 16 includes a plurality of LED units 142. Each LED unit 142 includes a red LED 142a, a green LED 142b, and a blue LED 142c. Each LED 142a/142b/142c can emit light beams of the one respective particular kind of primary color. Light beams emit from each LED 142a/142b/142c over a certain range of angles of divergence. When each LED 142a/142b/142c is viewed from above, the angle of divergence is generally in the range from 30 to 130 degrees, as measured from a front face of the LED 142a/142b/142c. Each LED 142a/142b/142c is arranged such that its angle of divergence expands toward the diffusing film 16. The reflector 18 includes an inner surface 182 facing the diffusing film 16, and a pattern 184 formed at the inner surface 182. The pattern 184 includes a plurality of reflective dots 186 outwardly extending from the inner surface 182. The reflective dots 186 have many kinds of shapes and sizes. In the illuminated embodiment, the reflective dots 186 are arc-shaped; for example, the reflective dots 186 may be hemispherical, sub-hemispherical, semicylindrical, or sub-semicylindrical. The reflective dots 186 are irregularly arranged.

In operation, light beams of one particular kind of primary color emit from each LED 142a/142b/142c, transmit toward the diffusing film 16, and reach the reflector 18 after being diffused by the diffusing film 16. Light beams striking at the reflective dots 186 at the inner surface 182 of the reflector 18 are reflected in all directions, and finally reach a light incident surface 122 of the light guide plate 12 after being diffused again by the diffusing film 16. A mixing process of light beams of different kinds of colors occurs since each LED 142a/142b/142c emits one kind of light beams, which mixing process occurs over a space up to where the mixed light beams reach the light guide plate 12. Because the light beams are diffused by the diffusing film 16 and are reflected by the reflective dots 186 in all directions, light beams of red, green and blue (RGB) are fully mixed during this mixing process, thus obtaining enough pure white light beams where the mixed light beams reach the light guide plate 12. This is achieved without requiring a larger sized backlight module with a larger mixing space. Therefore, optimized optical performance of the associated liquid crystal display 1 is also obtained, with the liquid crystal display 1 being able to be used in compact and small-scale applications.

Figure 3:
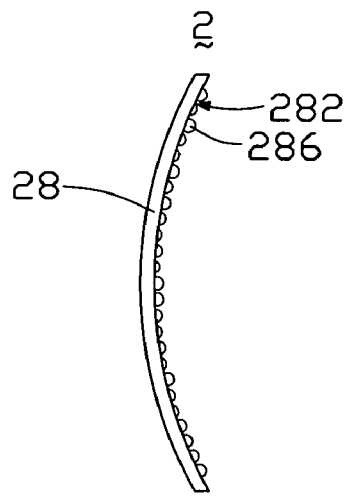
FIG. 3 is a top plan view of a reflector of a liquid crystal display according to a second embodiment of the present invention.

Referring to FIG. 3, a liquid crystal display 2 according to a second embodiment of the present invention is similar to the liquid crystal display 1. However, a plurality of reflective dots 286 outwardly extend regularly from an inner surface 282 of a reflector 28 of the liquid crystal display 2, and have many kinds of shapes and sizes.

Figure 4:
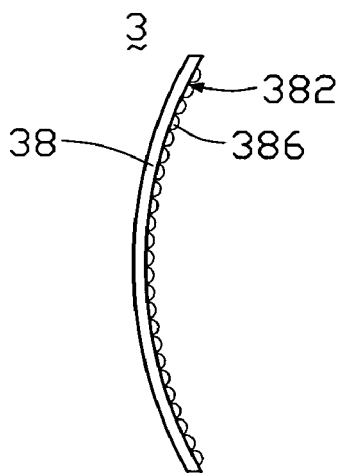
FIG. 4 is a top plan view of a reflector of a liquid crystal display according to a third embodiment of the present invention.

Referring to FIG. 4, a liquid crystal display 3 according to a third embodiment of the present invention is similar to the liquid crystal display 1. However, a plurality of reflective dots 386 outwardly extend regularly from an inner surface 382 of a reflector 38 of the liquid crystal display 3, with the reflective dots 386 having a same shape and a same size.

Figure 5:
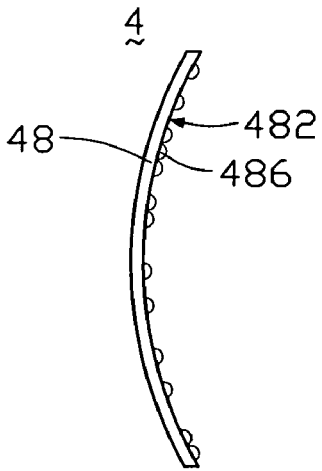
FIG. 5 is a top plan view of a reflector of a liquid crystal display according to a fourth embodiment of the present invention.

Referring to FIG. 5, a liquid crystal display 4 according to a fourth embodiment of the present invention is similar to the liquid crystal display 1. However, a plurality of reflective dots 486 outwardly extend irregularly from an inner surface 482 of a reflector 48 of the liquid crystal display 4, with the reflective dots 486 having a same shape and a same size.

Figure 6:
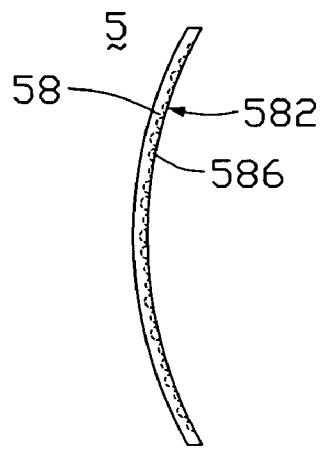
FIG. 6 is a top plan view of a reflector of a liquid crystal display according to a fifth embodiment of the present invention.

Referring to FIG. 6, a liquid crystal display 5 according to a fifth embodiment of the present invention is similar to the liquid crystal display 1. However, a plurality of continuous reflective dots 586 inwardly extend irregularly from a transparent inner surface 582 of a reflector 58 of the liquid crystal display 5, and have many kinds of shapes and sizes. That is, the reflective dots 586 are in the form of depressions in the inner surface 582.

Figure 7:
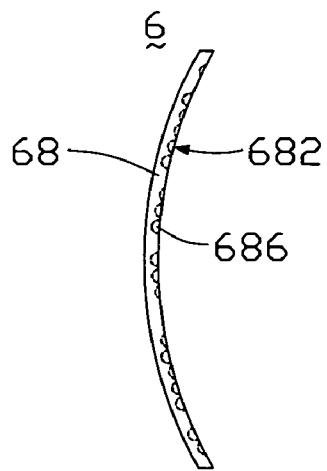
FIG. 7 is a top plan view of a reflector of a liquid crystal display according to a sixth embodiment of the present invention.

Referring to FIG. 7, a liquid crystal display 6 according to a sixth embodiment of the present invention is similar to the liquid crystal display 5. However, a plurality of continuous and discontinuous reflective dots 686 inwardly extend irregularly from a transparent inner surface 682 of a reflector 68 of the liquid crystal display 6, and have many kinds of shapes and sizes.

Figure 8:
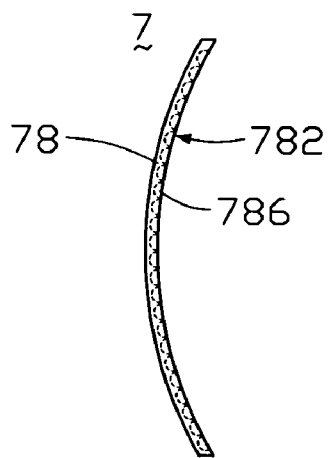
FIG. 8 is a top plan view of a reflector of a liquid crystal display according to a seventh embodiment of the present invention.

Referring to FIG. 8, a liquid crystal display 7 according to a seventh embodiment of the present invention is similar to the liquid crystal display 5. However, a plurality of continuous reflective dots 786 inwardly extend regularly from a transparent inner surface 782 of a reflector 78 of the liquid crystal display 7, with the reflective dots 786 having a same shape and a same size.

Figure 9:
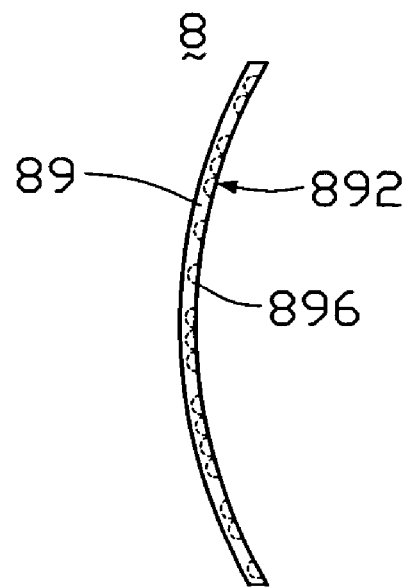
FIG. 9 is a top plan view of a reflector of a liquid crystal display according to an eighth embodiment of the present invention.

Referring to FIG. 9, a liquid crystal display 8 according to an eighth embodiment of the present invention is similar to the liquid crystal display 7. However, a plurality of continuous and discontinuous reflective dots 896 inwardly extend irregularly from a transparent inner surface 892 of a reflector 89 of the liquid crystal display 8, with the reflective dots 896 having a same shape and a same size.

Figure 10:
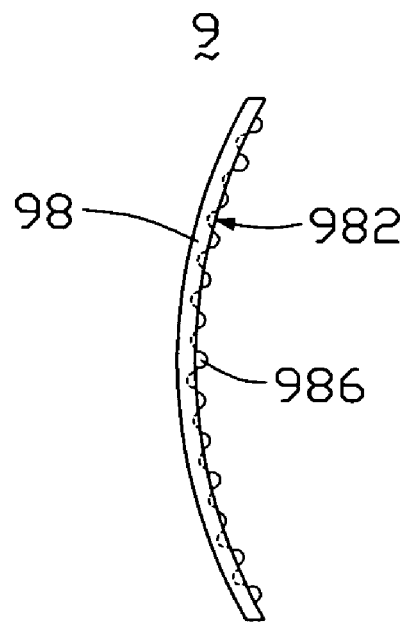
FIG. 10 is a top plan view of a reflector of a liquid crystal display according to a ninth embodiment of the present invention.

Referring to FIG. 10, a liquid crystal display 9 according to a ninth embodiment of the present invention is in effect a hybrid of the liquid crystal display 2 and the liquid crystal display 5. In the liquid crystal display 9, a plurality of reflective dots 986 extend both outwardly and inwardly from an inner surface 982 of a reflector 98 of the liquid crystal display 9. The reflective dots 986 have many kinds of shapes and sizes.

Figure 11:
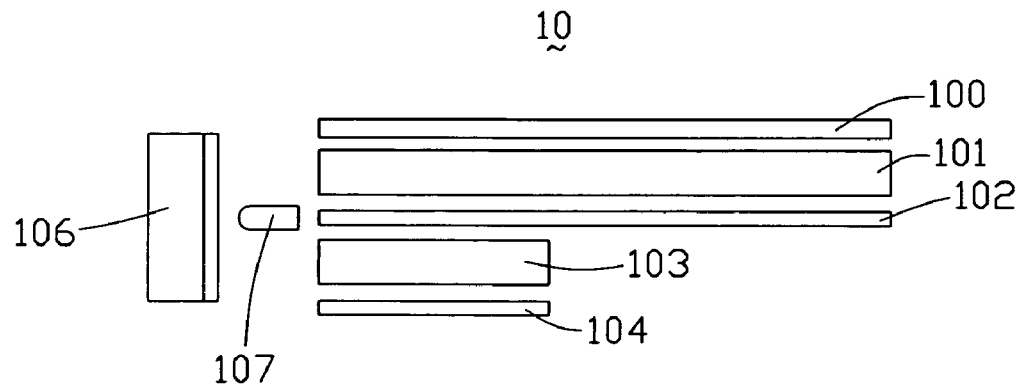
FIG. 11 is an exploded, side view of a liquid crystal display according to a tenth embodiment of the present invention.
Figure 12:
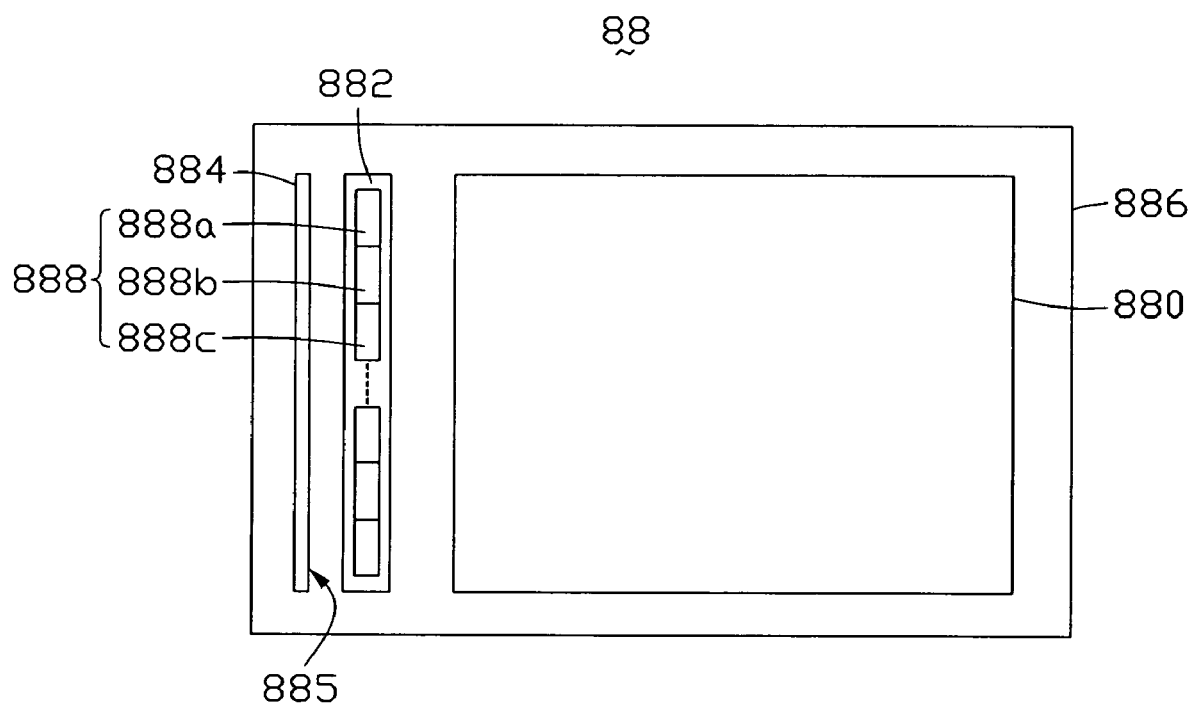
FIG. 12 is a top plan view of a conventional backlight module.

Referring to FIG. 11, a liquid crystal display according to a tenth embodiment of the present invention is shown. The liquid crystal display 10 includes an upper liquid crystal panel 100, an upper light guide plate 101, a middle reflector 102, a lower light guide plate 103, and a lower liquid crystal panel 104, arranged in that order from top to bottom. The liquid crystal display 10 further includes a side reflector 106 located adjacent to the middle reflector 102, and a light source 107 interposed between the middle reflector 102 and the side reflector 106. The side reflector 106 can be any one of the above-described reflectors 18~78, 89, 98 of the first through ninth embodiments. The liquid crystal display 10 can be used for double-sided displaying, and has advantages similar to those of the above-described liquid crystal displays 1 through 9.

Further or alternative embodiments may include the following. In one example, each LED can instead be another kind of point illuminator that has a certain angle of divergence.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A backlight module comprising:
 a light guide plate having a light incident surface;
 a reflector positioned adjacent to the light incident surface, the reflector comprising a reflection pattern thereat; and
 a light emitting diode unit interposed between the light incident surface and the reflector;
 wherein the light emitting diode unit comprises a plurality of light emitting diodes, each light emitting diode is configured to emit light beams only from a front face thereof over an angle of divergence as measure from the front face and the light emitting diode unit is arranged such that the angles of divergence of the light emitting diodes expand toward the reflector to make light beams emitted by the light emitting diode unit reach the reflector first and then be reflected by the reflector and finally reach the light incident surface.

2. The backlight module in claim 1, wherein the light emitting diode unit comprises a red light emitting diode, a green light emitting diode, and a blue light emitting diode.

3. The backlight module in claim 2, wherein the angle of divergence of each light emitting diode is in the range from 30 to 130 degrees.

4. The backlight module in claim 1, wherein the reflection pattern comprises a plurality of reflective dots.

5. The backlight module in claim 4, wherein the reflector further comprises an inner surface facing the light emitting diode unit.

6. The backlight module in claim 5, wherein the reflective dots outwardly extend from the inner surface.

7. The backlight module in claim 5, wherein the inner surface is transparent.

8. The backlight module in claim 7, wherein the reflective dots are depressions that inwardly extend from the inner surface.

9. The backlight module in claim 7, wherein some of the reflective dots outwardly extend from the inner surface and other of the reflective dots are depressions that inwardly extend from the inner surface.

10. The backlight module in claim 4, wherein the reflective dots extend regularly.

11. The backlight module in claim 4, wherein the reflective dots have different kinds of shapes and sizes.

12. The backlight module in claim 4, wherein the reflective dots have a same shape and a same size.

13. The backlight module in claim 4, wherein the reflective dots are arranged continuously.

14. The backlight module in claim 1, further comprising a diffusing film interposed between the light emitting diode unit and the reflector.

15. A liquid crystal. display comprising:
a liquid crystal panel; and
a backlight module adjacent to the liquid crystal panel the backlight module comprising:
a light guide plate having a light incident surface;
a reflector positioned adjacent to the light incident surface, the reflector comprising a reflection pattern thereat; and
a light emitting diode unit interposed between the light incident surface and the reflector;
wherein the light emitting diode unit comprises a plurality of light emitting diodes, each light emitting diode is configured to emit light beams only from a front face thereof over an angle of divergence as measured from the front face, and the light emitting diode unit is arranged such that the angles of divergence of the emitting diodes expand toward the reflector to make light beams emitted by the light emitting diode unit reach the reflector first and then be reflected by the reflector and finally reach the light incident surface.

16. The liquid crystal display in claim 15, wherein the light emitting diode unit comprises a red light emitting diode, a green light emitting diode, and a blue light emitting diode.

17. The liquid crystal display in claim 16, wherein the reflection pattern comprises a plurality of reflective dots.

18. A backlight module comprising:
a light guide plate having a light incident surface;
a reflector positioned adjacent to the light incident surface; and
a light emitting diode unit interposed between the light incident surface and the reflector;
wherein the tight emitting diode unit comprises a plurality of light emitting diodes, each light emitting diode is configured to emit light beams only from a front face thereof, and the light emitting diode unit is arranged such that the front faces of the light emitting diodes face the reflector to make light beams emitted by the light emitting diode unit reach the reflector first and then be reflected by the reflector and finally reach the light incident surface.

19. The backlight module in claim 4, wherein the reflective dots extend irregularly.

20. The backlight module in claim 4, wherein the reflective dots are arranged discontinuously.

* * * * *